Figure 3:
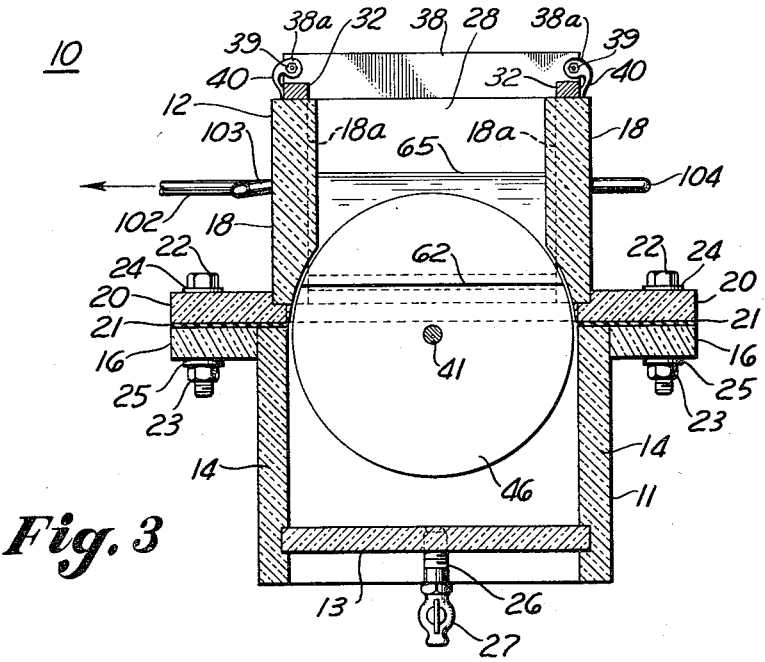

Dec. 25, 1956  R. Q. BOYER  2,775,552
CONTINUOUS ELECTROLYTIC PROCESS FOR
REDUCING URANIUM IN SOLUTION
Original Filed April 21, 1944  3 Sheets-Sheet 1
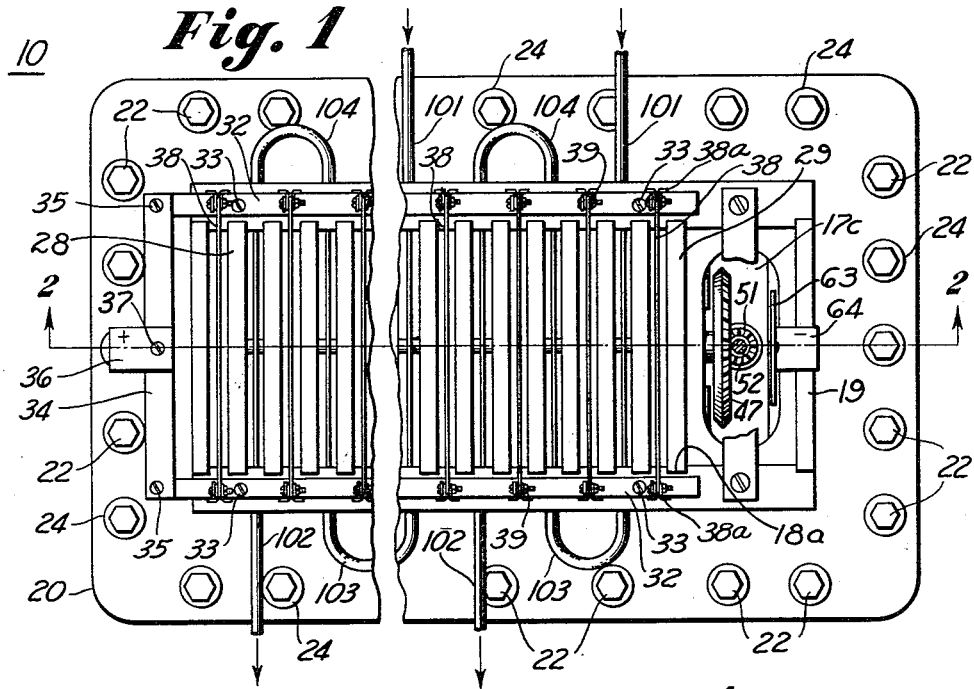
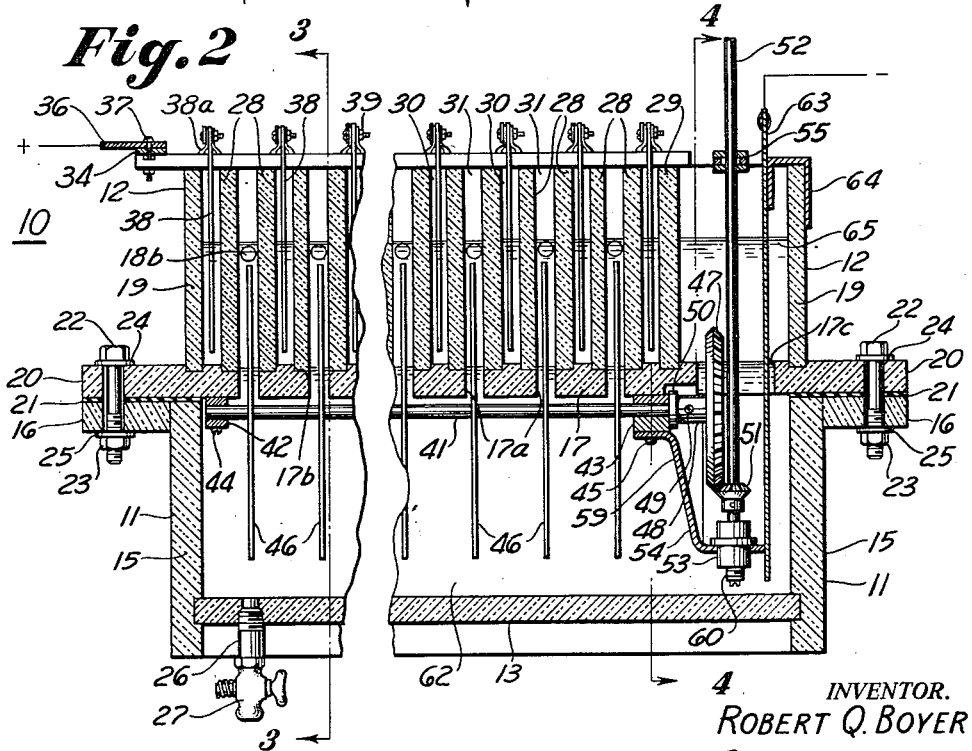
INVENTOR.
ROBERT Q. BOYER
ATTORNEY Dec. 25, 1956    R. Q. BOYER    2,775,552
CONTINUOUS ELECTROLYTIC PROCESS FOR
REDUCING URANIUM IN SOLUTION
Original Filed April 21, 1944    3 Sheets-Sheet 2

INVENTOR.
ROBERT Q. BOYER
BY
Robert A. Lavender

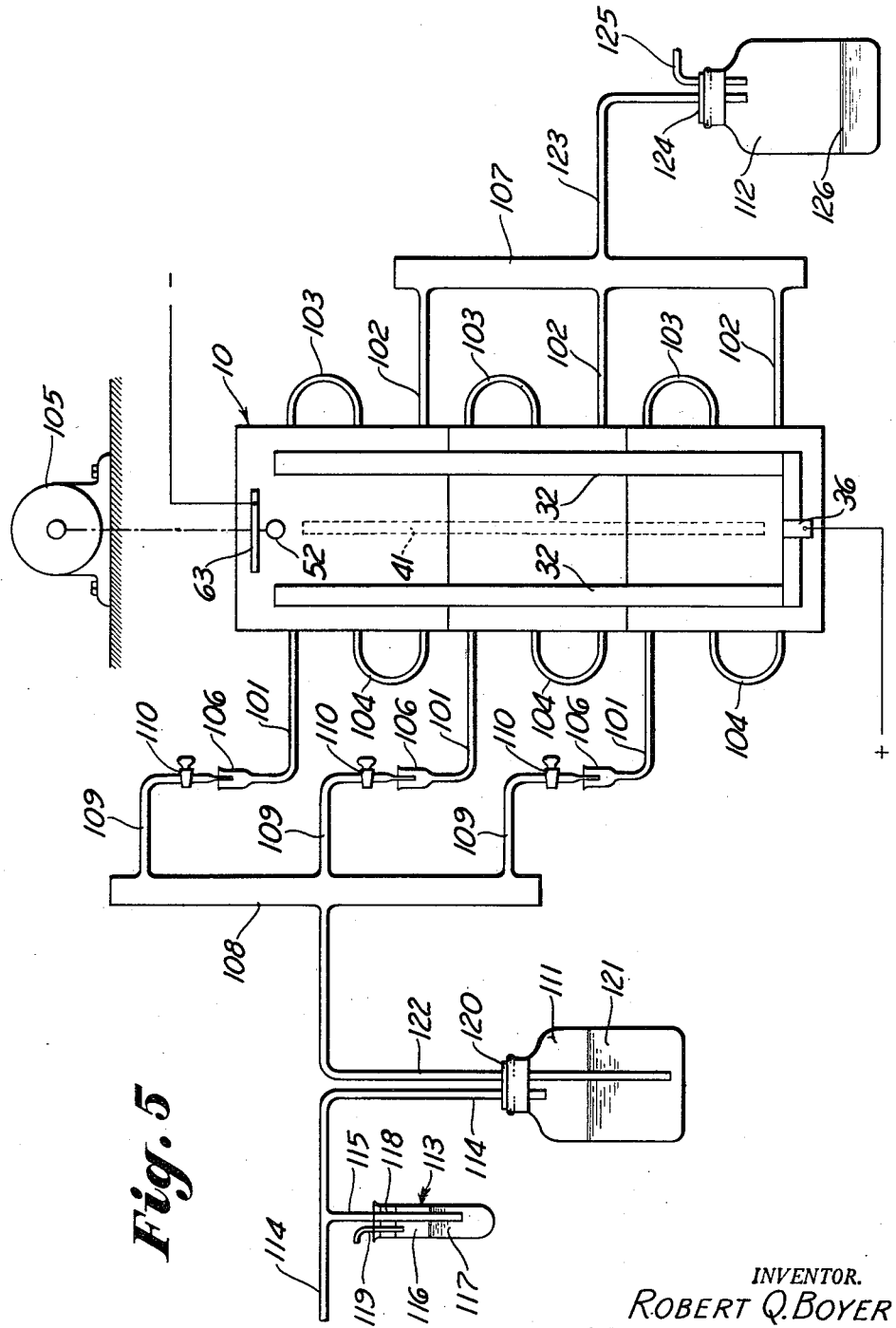

United States Patent Office 2,775,552
Patented Dec. 25, 1956

2,775,552

CONTINUOUS ELECTROLYTIC PROCESS FOR REDUCING URANIUM IN SOLUTION

Robert Q. Boyer, Berkeley, Calif., assignor to the United States of America as represented by the United States Atomic Energy Commission Original application April 21, 1944, Serial No. 532,162. Divided and this application September 10, 1945, Serial No. 615,467

3 Claims. (Cl. 204—124)

The present invention relates to uranium reclamation processes and, more particularly, to such processes including the continuous electrolytic reduction of oxidized acidic aqueous chloride solutions of uranium. The present application is a division of my copending application, Serial No. 532,162, filed April 21, 1944, and now Patent No. 2,743,228, granted April 24, 1956.

In the copending application of Ernest O. Lawrence, Serial No. 557,784, filed October 9, 1944, and now Patent No. 2,709,222, granted May 24, 1955, there is disclosed a "calutron," a machine designed to separate the constituent isotopes of an element and more particularly to increase the proportion of a selected isotope in an element containing several isotopes, in order to produce the element enriched with the selected isotope.

In the copending application of James M. Carter and Martin D. Kamen, Serial No. 532,159, filed April 21, 1944, and now Patent No. 2,758,006, granted August 7, 1956, there is disclosed a method for processing uranium in a calutron, wherein there is produced a variety of composite aqueous uranium solutions.

In the copending application of Martin D. Kamen and Abel de Haan, Serial No. 542,378, filed June 27, 1944, there is disclosed an improved process of purifying a composite solution of the character mentioned in order to separate uranium from metal impurities in the solution. In accordance with this process, a composite solution comprising $UO_2^{++}$, $Cu^{++}$, $Ni^{++}$, $Fe^{+++}$ and $Cr^{+++}$ ions is first acidified with HCl and then reduced electrolytically, whereby the uranyl ion, $UO_2^{++}$, and the ferric ion, $Fe^{+++}$, are respectively reduced to the uranous ion, $U^{++++}$, and the ferrous ion, $Fe^{++}$. Thus the reduced solution contains $U^{++++}$, $Cu^{++}$, $Ni^{++}$, $Fe^{++}$ and $Cr^{+++}$ ions. To the reduced solution there is added oxalic acid, whereby the uranium is precipitated as $U(C_2O_4)_2 \cdot 6H_2O$ away from the metal impurities in the solution. The solution is then filtered in order to obtain the uranous oxalate precipitate, leaving the metal ions mentioned in the filtrate; which standard compound of uranium is subjected to further treatment or is available for commercial use, as previously explained.

An object of the invention is to provide an improved process of reclaiming uranium from an oxidized chloride solution also containing metal impurities.

Figure 4:
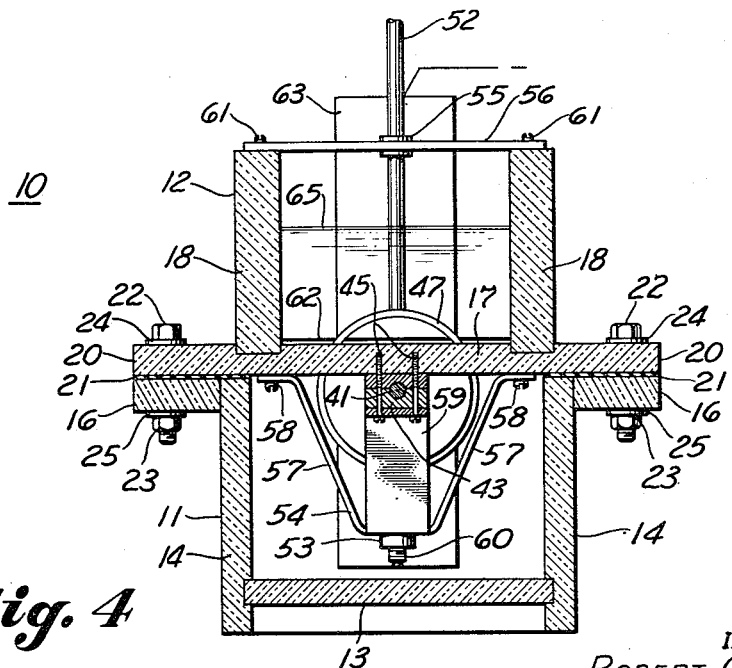

The invention both as to its organization and method of operation together with further objects and advantages thereof, will best be understood by reference to the following specification taken in connection with the accompanying drawings in which Figure 1 is a fragmentary plan view of an electrolytic cell in which there may be carried out the process of the present invention; Fig. 2 is a fragmentary longitudinal sectional view of the electrolytic cell taken along the line 2—2 in Fig. 1; Fig. 3 is a transverse sectional view of the electrolytic cell taken along the line 3—3 in Fig. 2; Fig. 4 is a transverse sectional view of the electrolytic cell taken along the line 4—4 in Fig. 2; and Fig. 5 is a diagrammatic illustration of a solution treatment system in which the electrolytic cell is incorporated.

Referring now more particularly to Figs. 1 to 4, inclusive, of the drawings, there is illustrated an electrolytic cell 10 which is suitable for carrying out the processes of the present invention and comprising a lower casing section 11 and an upper casing section 12. The lower casing section 11 is substantially rectangular in plan, including a flat bottom wall 13, upstanding side walls 14 and upstanding end walls 15, secured together in liquid-tight relation, the perimeter of the bottom wall 13 being received in interior grooves formed in the side walls 14 and in the end walls 15 adjacent the lower edges thereof. Further, the lower casing section 11 includes a rectangular outwardly extending flange 16 disposed about the upper open end thereof and rigidly secured to the adjacent outer surfaces of the side walls 14 and the end walls 15. Similarly, the upper casing section 12 is substantially rectangular in plan, including a flat bottom wall 17, upstanding side walls 18 and upstanding end walls 19, secured together in liquid-tight relation, the lower edges of the side walls 18 and the end walls 19 being received in a rectangular groove formed in the upper surface of the bottom wall 17, and disposed inwardly from the perimeter thereof. Accordingly, the bottom wall 17 of the upper casing section 12 extends outwardly from the side walls 18 and the end walls 19 in order to define in effect a rectangular outwardly extending flange 20, disposed about the lower closed end of the upper casing section 12. Preferably, the parts of the lower casing section 11 and the upper casing section 12 are formed of laminated phenol-aldehyde resins such as "Bakelite," "Textolite" or other similar insulating material.

The upper casing section 12 is assembled upon the lower casing section 11, the rectangular flanges 20 and 16 being congruent. Also, a sealing gasket 21, formed of rubber or the like, is arranged between the lower surface of the bottom wall 17 and the upper edge of the side walls 14 and the end walls 15, and extending between the flanges 20 and 16. Finally, the flanges 16 and 20 are removably secured together in liquid-tight relation by a series of bolts 22, extending through aligned openings formed therein, the ends of the bolts 22 receiving nuts 23. Washers 24 and 25 surround the shanks of the bolts 22 and are respectively disposed between the heads of the bolts 22 and the upper surface of the flange 20, and between the nuts 23 and the lower surface of the flange 16. Further, a drain pipe 26 is threaded in an opening formed in the bottom wall 13 adjacent the left-hand end wall 15, which drain pipe communicates with the interior of the lower casing section 11. The end of the drain pipe 26 terminates in a petcock 27, whereby the drain pipe 26 may be selectively opened or closed.

A number of laterally extending and longitudinally spaced apart slots 17a are provided through the bottom wall 17 within the area bounded by the side walls 18 and the end walls 19; and a corresponding plurality of upstanding laterally extending and longitudinally spaced apart pairs of partition elements 28 are carried by the upper surface of the bottom wall 17, the individual partition elements 28 of each pair being disposed on the opposite side of a slot 17a. More particularly, each upstanding partition element 28 is retained in place by a pair of aligned upstanding slots 18a, formed in the inner surfaces of the side walls 18, and an aligned laterally extending recess 17b, formed in the upper surface of the bottom wall 17 adjacent a slot 17a. Thus, each partition element 28 is retained in place in upstanding position by a substantially U-shaped composite groove comprising a pair of upstanding slots 18a formed in the inner surfaces of the side walls 18 and a cooperating laterally extending recess 17b formed in the upper surface of the bottom wall 17. Finally, an upstanding laterally extending partition element 29 is carried by the upper surface of the bottom wall 17, the partition element 29 being spaced longitudinally and to the right-hand side of the partition element 28 disposed most remote from the left-hand end wall 19. Also, the upstanding partition element 29 is retained in place by a pair of upstanding cooperating slots formed in the inner surfaces of the side walls 18 and an aligned laterally extending recess formed in the upper surface of the bottom wall 17, in a manner identical to that previously explained in conjunction with each partition element 28.

The various partition elements 28 and the partition element 29 comprise rectangular plates formed of a porous semipermeable insulating material of the ceramic type, such as alundum or sintered Pyrex glass. Collectively, the pairs of partition elements 28 and the partition element 29 constitute partition structure defining a plurality of interposed anode and cathode compartments 30 and 31, respectively, in the upper casing section 12. More particularly, the two partition elements 28 of each pair cooperate with each other and with the portions of the side walls 18 disposed therebetween to define a cathode compartment 31 having an open lower end formed by a cooperating slot 17a. Similarly, each left-hand partition element 28 of a pair cooperates with the adjacent right-hand partition element 28 of a pair and with the portions of the side walls 18 and the bottom wall 17 disposed therebetween to define an anode compartment 30 having a closed lower end. Further, the left-hand partition element 28 of the pair disposed adjacent the left-hand end wall 19 cooperates therewith and with the portions of the side walls 18 and the bottom wall 17 disposed therebetween to define the anode compartment 30 disposed immediately adjacent the left-hand end wall 19. Finally, the right-hand partition element 28 of the pair disposed adjacent the partition element 29 cooperates therewith and with the portions of the side walls 18 and the bottom wall 17 disposed therebetween to define the anode compartment 30 disposed most remote from the left-hand end wall 19.

The upper edges of the various pairs of partition elements 28 and the partition element 29 are disposed substantially flush with the upper edges of the side walls 18, and the upper edges of the side walls 18 are substantially flush with the upper edges of the end walls 19; whereby the upper edge of the upper casing section 12 is substantially flat and parallel to the bottom wall 13 of the lower casing section 11. Further, a pair of conductors in the form of busbars 32, formed of copper or the like, are secured to the upper edges of the side walls 18 by a number of screws 33. The left-hand ends of the busbars 32 are secured together by a conducting strap 34 by screws 35; and a conducting terminal 36 is secured to the mid-portion of the strap 34 by a screw 37. A plurality of anode elements 38 is carried by the busbars 32 and arranged in the respective anode compartments 30. Each of the anode elements 38 comprises a substantially rectangular plate provided at its upper end with laterally and oppositely extending lugs 38a which overhang the respective busbars 32. The anode elements 38 are formed of a conducting material resistant to chlorine and hydrochloric acid solutions, such as graphite, and are electrically connected to the busbars 32 by terminal structure including screws 39 and flexible conductors 40. More particularly, the flexible conductors 40 are of the braid or pigtail type, one end of each pigtail 40 being brazed or soldered to the adjacent busbar 32, and the other end of the pigtail 40 being provided with an eyelet through which the associated screw 39 extends, the screw 39 extending through the adjacent lug 38a formed on the cooperating anode element 38. Thus, the terminal 36 is connected by low-resistance paths to each of the anode elements 38 in multiple, whereby collectively the anode elements 38 constitute an anode.

A longitudinally extending shaft 41 is rotatably mounted in two bearing brackets 42 and 43, secured to the lower surface of the bottom wall 17 by screws 44 and 45, respectively. The bearing brackets 42 and 43 are aligned substantially along the longitudinal centerline of the bottom wall 17 and consequently of the electrolytic cell 10; the bearing bracket 42 being disposed adjacent the left-hand end wall 15, and the bearing bracket 43 being disposed remote from the left-hand end wall 15 and spaced some distance from the right-hand end wall 15. The bearing brackets 42 and 43 may suitably comprise complementary sections formed of stainless steel and secured together and to the bottom wall 17 by the screws 44 and 45, as previously noted. The shaft 41 carries a plurality of longitudinally spaced apart cathode members 46 in the form of disks. Each of the cathode members 46 is rigidly secured to the shaft 41, so that it is rotatable therewith, and extends downwardly into the lower casing section 11 and upwardly through a cooperating one of the slots 17a into a cooperating one of the cathode compartments 31 formed in the partition structure within the upper casing section 12. The cathode members 46 are formed of a conducting material resistant to chlorine and hydrochloric acid solutions that readily amalgamates with mercury, such, for example, as nickel. The cathode members 46 are electrically connected to the shaft 41 in multiple and collectively constitute a cathode.

A laterally extending opening 17c is provided through the bottom wall 17 adjacent the right-hand end wall 19; and a bevel gear 47 is rigidly secured to the right-hand end of the shaft 41, whereby the upper portion of the bevel gear 47 extends upwardly through the opening 17c into the upper casing section 12, and the lower portion of the bevel gear 47 extends downwardly into the lower casing section 11. More particularly, the bevel gear 47 is provided with a collar 48 which is secured to the right-hand end of the shaft 41 by a setscrew 49 and carries a flange 50 engaging the right-hand side of the bearing bracket 43 to provide a thrust bearing for the shaft 41.

The bevel gear 47 meshes with a bevel gear 51 rigidly secured to an upstanding operating shaft 52 adjacent the lower end thereof. The extreme lower end of the operating shaft 52 is supported in a thrust bearing 53 carried by a bearing bracket 54; and the upper end of the operating shaft 52 is supported by a guide bearing 55 carried by a bearing strap 56. More particularly, the bearing bracket 54 comprises two laterally upwardly and outwardly extending legs 57, which are secured by screws 58 to the lower surface of the bottom wall 17, and a longitudinally upwardly and outwardly extending leg 59, which is secured by the screws 45 to the bearing bracket 43. The thrust bearing 53 comprises a threaded step 60 accommodating adjustment of the operating shaft 52 in the vertical direction, and consequently proper mesh between the bevel gear 51 carried thereby and the bevel gear 47 carried by the shaft 41. The bearing strip 56 extends laterally across the upper casing section 12, and the opposite ends thereof are suitably anchored to the upper edges of the side walls 18 by screws 61.

A pool of mercury 62 is arranged in the lower casing section 11, the mass of the mercury pool being such that columns of mercury rise in the slots 17a into the cathode compartments 31. Preferably, the columns of mercury rise into the cathode compartments 31 a slight distance above the upper surface of the bottom wall 17, whereby the shaft 41 and the lower segments of the cathode members 46 are immersed in the mercury pool 62. An upstanding cathode plate 63 extends through the upper casing section 12 downwardly through the opening 17c and terminates in the lower casing section 11, whereby the lower end of the cathode plate 63 is immersed in the mercury pool 62. A substantially U-shaped clip 64 is rigidly secured to the cathode plate 63 and is adapted to overhang the adjacent upper edge of the right-hand end wall 19, thereby securely to retain the cathode plate 63 in position.

Further, a body of electrolyte 65 is arranged in the upper casing section 12 as a head upon the mercury pool 62, the body of electrolyte 65 filling the various anode and cathode compartments 30 and 31, respectively, and electrically communicating through the porous partition structure including the partition elements 28 and 29, the mass of the body of electrolyte 65 being such that the upper segments of the cathode members 46 are completely immersed therein. The cathode compartments 31 in the upper casing section 12 are arranged in groups, each group containing several adjacent individual cathode compartments, the individual cathode compartments in each group being connected in series relation by a conduit system, and the different groups of cathode compartments being connected in parallel relation by the conduit system.

Considering now the illustrated embodiment of the electrolytic cell 10 in greater detail, the partition structure comprises nine pairs of partition elements 28, whereby nine individual cathode compartments 31 are formed in the upper casing section 12 and arranged in longitudinally spaced apart relation, each of the cathode compartments 31 communicating through the associated slot 17a with the lower casing section 11. Also, the rotatably mounted shaft 41 carries nine longitudinally spaced apart cathode members 46 which extend through the respective slots 17a into the respective cathode compartments 31. Further, the partition structure comprising the nine pairs of partition elements 28 and the partition element 29 forms ten individual anode compartments 30 in the upper casing section 12, arranged in longitudinally spaced apart relation and in interposed relation with respect to the cathode compartments 31. Thus, in the partition structure an anode compartment 30 is positioned on either side of each cathode compartment 31. The nine cathode compartments 31 are arranged in three groups of three individual cathode compartments each; the three groups of cathode compartments 31 are connected in multiple by the the conduit system mentioned; and the three individual cathode compartments 31 in each group are connected in series by the conduit system mentioned.

Referring now more particularly to Figs. 1, 2 and 5, the conduit system mentioned comprises three inlet pipes 101, respectively serving the three groups of cathode compartments 31 and respectively communicating with the first, fourth and seventh individual cathode compartments 31; positioned from the top of the electrolytic cell 10 toward the bottom thereof, as viewed in Fig. 5, and from the right-hand side of the electrolytic cell 10 toward the left-hand side thereof, as viewed in Fig. 1. Also, the conduit system mentioned comprises three outlet pipes 102, respectively serving the three groups of cathode compartments 31 and respectively communicating with the third, sixth and ninth individual cathode compartments 31. The adjacent right-hand ends of the first and intermediate individual cathode compartments 31 in each group are connected together by U-shaped header pipes 103, the adjacent right-hand ends of the first, second and fourth, fifth and seventh, eighth individual cathode compartments 31 in the electrolytic cell 10 being so connected by the header pipes 103. The adjacent left-hand ends of the intermediate and last cathode compartments 31 in each group are connected together by U-shaped header pipes 104, the adjacent left-hand ends of the second, third and fifth, sixth and eighth, ninth individual cathode compartments 31 in the electrolytic cell 10 being so connected by the header pipes 104. In conjunction with the conduit system, it is noted that a series of aligned openings 18b are formed in the side walls 18 and communicate with the cathode compartments 31 in order to receive the various pipes 101, 102, 103 and 104, the openings 18b being disposed above the cathode members 46 so that the upper segments of the cathode members are completely immersed in the body of electrolyte 65.

Accordingly, it will be understood that a first stream of electrolyte may be conducted from a first of the inlet pipes 101 through the first cathode compartment, via a first of the header pipes 103, through the second cathode compartment, via a first of the header pipes 104, and through the third cathode compartment to a first of the outlet pipes 102. Similarly, a second stream of electrolyte may be conducted from a second of the inlet pipes 101 through the fourth cathode compartment, via a second of the header pipes 103, through the fifth cathode compartment, via a second of the header pipes 104, and through the sixth cathode compartment to a second of the outlet pipes 102. Finally, a third stream of electrolyte may be conducted from a third of the inlet pipes 101 through the seventh cathode compartment, via a third of the header pipes 103, through the eighth cathode compartment, via a third of the header pipes 104, and through the ninth cathode compartment to a third of the outlet pipes 102. Thus, the conduit system connects the individual cathode compartments 31 in the electrolytic cell 10 in parallel series relation.

Considering now the arrangement of the solution treatment system in greater detail, reference is made to Fig. 5. The operating shaft 52 is suitably connected to a motor 105, which is preferably of the electric type; the cathode plate 63 is connected to the negative terminal of a source of direct current supply; and the terminal 36 is connected to the positive terminal of the source of direct current supply. Thus, when the motor 105 is operated, the operating shaft 52 is rotated, causing the bevel gear 51 to drive the bevel gear 47 in order to rotate the shaft 41. As the shaft 41 is rotated, the cathode members 46 are rotated, whereby repeatedly the lower segment of each of the cathode members or disks 46 is removed from the mercury pool 62 and immersed in the body of electrolyte 65 in the associated one of the cathode compartments 31, and the upper segment thereof is removed from the body of electrolyte 65 in the associated one of the cathode compartments 31 and immersed in the mercury pool 62. The motor 105 is operated at a suitable speed in view of the gear reduction ratio between the bevel gear 51 and the bevel gear 47, so that the shaft 41 and consequently the disks 46 rotate at the required speed, as explained more fully hereinafter.

Each of the inlet pipes 101 terminates in a funnel 106; and each of the outlet pipes 102 terminates in an outlet header 107. Also, the conduit system comprises an inlet header 108 provided with three branches 109, which respectively feed the three funnels 106 respectively terminating the three inlet pipes 101. More particularly, each of the branches 109 is provided with an adjustable petcock 110, whereby the flow of electrolyte therefrom into the associated funnel 106 may be selectively controlled. Finally, the conduit system comprises a supply receptacle 111, a storage receptacle 112, a pressure regulator 113, and a pressure conduit 114. One end of the pressure conduit 114 is connected to a source of air under pressure, not shown; and the other end of the pressure conduit 114 terminates in the supply receptacle 111. Also, the mid-section of the pressure conduit 114 is connected to an upstanding tube 115 extending into the pressure regulator 113. More particularly, the pressure regulator 113 comprises a vessel 116 containing a column of mercury 117, into which the upstanding tube 115 extends, the lower end of the upstanding tube 115 being submerged the required depth in the column of mercury 117 in order to establish a corresponding predetermined blow-out pressure in the vessel 116. The upper end of the vessel 116 is closed by a stopper 118, through which a vent pipe 119 extends. It will be understood that the pressure regulator 113 maintains the previously mentioned pressure in the end of the pressure conduit 114 extending into the supply receptacle 111. In the event the pressure in the pressure conduit 114 exceeds the predetermined pressure mentioned, air is blown through the upstanding tube 115 against the predetermined column of mercury 117 into the upper portion of the vessel 116, and vented to the atmosphere via the vent pipe 119, whereby the air pressure in the pressure conduit 114 is maintained at the required value.

The supply receptacle 111 is in the form of a bottle, the throat of which is closed by a stopper 120 through which the pressure conduit 114 extends, the lower end of the pressure conduit 114 terminating adjacent the top of the supply receptacle 111. Also, the supply receptacle 111 contains a quantity of electrolyte 121 which is to be conducted through the electrolytic cell 10 to the storage receptacle 112. A conduit 122 extends through the stopper 120, and connects the supply receptacle 111 to the inlet header 108, one end of the conduit 122 being connected to the inlet header 108 and the other end of the conduit 122 terminating in the supply receptacle 111 adjacent the bottom thereof. Finally, the outlet header 107 is connected by a conduit 123 to the storage receptacle 112, one end of the conduit 123 being connected to the outlet header 107 and the other end of the conduit 123 terminating in the storage receptacle 112 adjacent the top thereof. The storage receptacle 112 is in the form of a bottle, the throat of which is closed by a stopper 124 through which the conduit 123 extends. Also, a vent pipe 125 extends through the stopper 124; and the storage receptacle 112 is adapted to receive and store a quantity of electrolyte 126 which has been conducted through the electrolytic cell 10.

Considering now the flow of the electrolyte in the conduit system through the electrolytic cell 10, it will be understood that a predetermined regulated pressure is maintained by the pressure regulator 113 in the pressure conduit 114, whereby the regulated pressure is maintained in the upper portion of the supply receptacle 111. The pressure maintained in the upper portion of the supply receptacle 111 as a head over the quantity of electrolyte 121 therein, forces the electrolyte through the conduit 122 into the inlet header 108, and consequently into the three branches 109. The petcocks 110 are appropriately adjusted, whereby three streams of electrolyte are delivered into the three associated funnels 106, causing the required static head of electrolyte to be maintained in the three inlet pipes 101. The electrolyte flows from the three inlet pipes 101 through the three groups of cathode compartments 31, in parallel series relation in the electrolytic cell 10, into the outlet pipes 102, in the manner previously explained. The electrolyte then flows from the outlet pipes 102 into the outlet header 107, and therefrom through the conduit 123 into the storage receptacle 112. As the electrolyte 126 is delivered to the storage receptacle 112, air therein is vented through the vent pipe 125 to the atmosphere.

Considering now the construction and arrangement of the component elements of the electrolytic cell 10 in greater detail, reference is again made to Figs. 1 to 4 inclusive, and it is noted that in the specific embodiment of the electrolytic cell 10 illustrated, each of the disks 46 has a diameter approximately 12 cm. and approximately 40% and 60% of its area are respectively immersed in the body of electrolyte 65 and in the mercury pool 62. Thus, about 80 cm.$^2$ of the area of each of the disks 46 is immersed in the body of electrolyte 65, whereby the total area of the cathode immersed in the body of electrolyte 65 is approximately 720 cm.$^2$. Employing an electrolyte constituting a hydrochloric acid solution, electrolytic currents within the range 150 to 175 amperes have been obtained, whereby the electrolytic current was approximately 0.2 ampere per cm.$^2$ of the area of the cathode, which value is well within the usual operating limits, 0.1 to 0.3 ampere per cm.$^2$ at the cathode, for electrolytic cells. The electrolytic current mentioned, was obtained, when several volts, about four, direct current was applied between the cathode plate 63 and the anode terminal 36. Under the operating conditions mentioned, it was found that three streams of electrolyte conducted through the three groups of cathode compartments 31 of reasonable volume permitted operation without undue heating of either the electrolytic cell 10 or the electrolyte. More particularly, each of the three streams of electrolyte comprised a flow of approximately 50 cc. per minute; the temperature rise of the electrolyte being of the order of 55° C. Specifically, 150 cc. of electrolyte per minute were conducted through the cell, experiencing a temperature rise from 15°–20° C. to 70°–75° C. When the electrolyte was conducted through the electrolytic cell 10 at the rate and under the operating conditions mentioned, there was no undue heating of the component parts of the electrolytic cell.

Now considering the operation of the electrolytic cell 10 in conjunction with the solution treatment system in carrying out the processes of the present invention it is noted that the anode and cathode compartments 30 and 31 are initially filled with a body of electrolyte 65 comprising about 3 N HCl; then the solution to be treated is conducted from the supply receptacle 111 through the cathode compartments 31 operating under the conditions specified; whereby the initial body of electrolyte 65 in the cathode compartments 31 is at least partially displaced by the solution which then becomes part of the electrolyte in the cathode compartments 31. Specifically, the solution which is conducted from the supply recepticle 111 is about 3 N HCl and contains $UO_2{}^{++}$, $Fe^{+++}$, $Cu^{++}$, $Ni^{++}$ and $Cr^{+++}$ ions. This hydrochloric acid solution is prepared in the manner disclosed in the previously mentioned copending application of Kamen and De Haan; which acid solution comprises a wash solution produced in the manner disclosed in the previously mentioned copending application of Carter and Kamen; which wash solution is derived from a calutron of the character of that disclosed in the previously mentioned application of Lawrence.

The solution is reduced in the electrolytic cell 10 and is conducted into the storage receptacle 112, the solution conducted into the storage receptacle 112 comprising $U^{++++}$, $Cu^{++}$, $Ni^{++}$, $Fe^{++}$ and $Cr^{+++}$ ions. More particularly, the established rate of flow of the solution through the electrolytic cell 10, under the operating conditions specified, is such that the uranyl ion, $UO_2{}^{++}$, and the ferric ion, $Fe^{+++}$, are respectively reduced by the electrolytic current to the uranous ion, $U^{++++}$, and the ferrous ion, $Fe^{++}$. Of course it will be understood that a small amount of the ions $Cu^{++}$, $Ni^{++}$, $Fe^{++}$ and $Cr^{+++}$ are completely reduced to the metal states $Cu^0$, $Ni^0$, $Fe^0$ and $Cr^0$ by the electrolytic current, which metal impurities in the body of electrolyte 65 are carried by the rotating disks 46 into the mercury pool 62. It will be understood that by suitably altering the operating conditions, such as by reducing the rate of flow of electrolyte through the cell and/or by increasing the current density, the reduction of ions other than $U^{++++}$ to the metal state may be made substantially complete, if desired. The metal impurities carried into the mercury pool 62 by the rotating disks 46 are either trapped therein or amalgamated therewith, whereby the body of electrolyte 65 is kept free of metal impurities liberated therein incident to the electrolysis. Specifically, the copper, chromium and nickel impurities readily amalgamate with the mercury pool 62, whereas the iron impurity is trapped therein. On the other hand, none of the uranous ion, $U^{++++}$, is completely reduced to the metal state, $U^0$, due to the fact that it inherently possesses a high over-voltage.

Further, it will be understood that the rotation of the disks 46 is effective not only to carry the metal impurities from the body of electrolyte 65 into the mercury pool 62 in the manner previously explained, but it also agitates the body of electrolyte 65 and the mercury pool 62 in order to facilitate the electrolysis. Finally, the constant rotation of the disks 45 causes a freshly amalgamated surface thereof to be presented from the mercury pool 62 to the body of electrolyte 65, thereby maintaining substantially constant the internal resistance of the electrolytic cell 10 and consequently the electrolytic current therethrough. Under the operating conditions specified the electrolytic cell 10 requires no separate cooling system.

Incident to operation of the electrolytic cell 10, the anion $Cl^-$ migrates through the partition elements 28 to the anode elements 38 disposed in the anode compartments 30, whereby some $Cl_2$ gas is liberated and escapes from the anode compartments 30 to the atmosphere. Of course some of this chlorine gas is trapped in the electrolyte disposed in the anode compartment 30; however, substantially none of it migrates through the porous partition elements 28 into the electrolyte disposed in the cathode compartment 31, due to the character of the porous partition elements 28, the porosity of the partition elements 28 accommodating conduction of the electrolyte and consequently the electrolytic current therethrough, but substantially preventing the migration of the chlorine therethrough whether in the vapor phase or in solution in the electrolyte. This arrangement is very advantageous, in view of the fact that the chlorine does not contaminate the electrolyte disposed in the cathode compartments 31, whereby the oxidizing effect of chlorine on the ions in the cathode compartments 31 is eliminated. Of course it will be understood that chlorine gas possesses a high oxidizing potential and is capable readily of oxidizing the uranous ion, $U^{++++}$, back to the uranyl ion, $UO_2^{++}$, as well as $Fe^{++}$ back to $Fe^{+++}$, thereby preventing efficient operation of the electrolytic cell 10. However, this difficulty is overcome due to the construction of the partition structure mentioned, whereby the electrolytic cell 10 operates efficiently substantially entirely to reduce the uranyl and ferric ions to the uranous and ferrous ions, as previously noted.

After the electrolytic cell has been employed to treat a predetermined quantity of chloride solution in order to reduce the contained ions in the manner previously explained, the mercury pool 62 becomes somewhat contaminated with the metal impurities mentioned. At this time, the petcock 27 may be opened, allowing the mercury pool 62 disposed in the lower casing section 11 and the body of electrolyte 65 remaining in the cathode compartments 31 in the upper casing section 12 to be drained therefrom and conserved. The body of electrolyte 65 remaining in the anode compartments 30 in the upper casing section 12 may be drained therefrom in any suitable manner and discarded; for example, such electrolyte may be siphoned out of the anode compartments 30. The conserved electrolyte is then returned to the supply receptacle 111 to be treated subsequently, and the mercury is reconditioned in order to eliminate the amalgamated and trapped metal impurities. Also, at this time the other component parts of the electrolytic cell 10 may be cleaned, thereby reconditioning the cell for further use. Thereafter, the required amount of fresh mercury is poured back into the lower casing section 11 through the opening 17c formed in the bottom wall 17, in order to form a new mercury pool 62 of the character specified. A quantity of electrolyte, 3 N HCl, is poured into the upper casing section 12 through the open top in order to form a body of electrolyte 65 as a head on the mercury pool 62 and to fill the anode and cathode compartments 30 and 31, respectively, in the manner previously explained. At this time, the electrolytic cell 10 is conditioned for subsequent operation in the manner previously noted.

It is pointed out that the quantity of chloride solution 126 contained in the storage receptacle 112 which has been treated or reduced in the electrolytic cell 10 is subsequently subjected to a suitable purification treatment in order to recover the contained uranium, such, for example, as that disclosed in the previously mentioned copending application of Kamen and De Haan.

The term "uranium" is employed in the present specification in a generic sense, without reference to whether it is present in the free or combined states, unless indicated otherwise by the context.

In view of the foregoing, it will be apparent that there has been provided an improved process, which is especially adapted for use in conjunction with the reduction of uranium solutions incident to the purification of wash solutions derived from calutrons.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a process for reclaiming uranium values from an oxidized hydrochloric acid solution of about 3 N concentration and containing $UO_2^{++}$ ions and ions selected from the group consisting of $Fe^{+++}$, $Cu^{++}$, $Ni^{++}$, and $Cr^{+++}$ ions, the steps comprising continuously passing said solution through the cathode compartment of an operating electrolytic cell having a rotating cathode which is provided with a thin, continuously-replaceable mercury coating and an anode compartment filled with a hydrochloric acid electrolyte of about 3 N concentration and separated from said cathode compartment by a porous barrier, continuously and simultaneously correlating the rate of flow of said solution through said cathode compartment of the operating cell with the electrolytic current density applied therethrough to promote the reduction of the $UO_2^{++}$ ions to $U^{++++}$ ions and the reduction of ions of said group to the metallic state and which are absorbed in said mercury cathode coating, and simultaneously and continuously replacing said mercury cathode coating by displacement during immersion of a portion of said rotating cathode in a relatively large volume of mercury.

2. In a process for reclaiming uranium values from an oxidized hydrochloric acid solution of about 3 N concentration and containing $UO_2^{++}$ ions and ions selected from the group consisting of $Fe^{+++}$, $Cu^{++}$, $Ni^{++}$, and $Cr^{+++}$ ions, the steps comprising continuously passing said solution through the cathode compartment of an operating electrolytic cell having a rotating cathode which is provided with a thin, continuously-replaceable mercury coating and having an anode compartment separated from said cathode compartment by a porous barrier which anode compartment is also filled with a hydrochloric acid anolyte of about 3 N concentration, continuously and simultaneously correlating the rate of flow of said solution through said cathode compartment of the operating cell with the electrolytic current density applied therethrough to promote the reduction of said $UO^{++}$ ions to $U^{++++}$ ions and the reduction of $Fe^{++}$ ions to $Fe^{+++}$ ions, and continuously and simultaneously replacing said mercury cathode coating with fresh mercury during immersion of a portion of said rotating cathode in a relatively large volume of mercury.

3. The process as defined in claim 2 wherein said correlation of the rate of flow of the solution with the electrolytic current density is such that the rate of solution flow is in the range of 1 to 1.17 cc. per minute with respect to a cathode electrolytic current density in the range of 0.1 to 0.3 ampere per cm.$^2$ and said anolyte comprises hydrochloric acid of about 3 N concentration.

References Cited in the file of this patent

UNITED STATES PATENTS 1,970,973    Palmaer _____ Aug. 21, 1934

(Other references on following page)

UNITED STATES PATENTS

| | | |
|---|---|---|
| 2,361,143 | Leute et al. | Oct. 24, 1944 |
| 2,389,691 | Schumacher et al. | Nov. 27, 1945 |

OTHER REFERENCES

Zeitschrift für Anorganische Chemie, vol. 57 (1908), pages 235, 236 (part of an article by Rosenheim et al.).

"Uranium and Atomic Power," by Jack De Ment and H. C. Dake, Chemical Publishing Co., New York, 1941, page 189.

Electrolytic Oxidation and Reduction, by S. Glasstone et al., D. Van Nostrand Co., 1936, pages 137, 138.